United States Patent
Yang et al.

(10) Patent No.: US 10,164,252 B2
(45) Date of Patent: *Dec. 25, 2018

(54) COMPOSITE ANODE ACTIVE MATERIAL, METHOD OF PREPARING THE SAME, AND ANODE AND LITHIUM SECONDARY BATTERY INCLUDING THE COMPOSITE ANODE ACTIVE MATERIAL

(71) Applicants: Samsung Electronics Co., Ltd., Suwon-si, Gyeonggi-do (KR); Samsung SDI Co., Ltd., Yongin-si, Gyeonggi-do (KR)

(72) Inventors: Jeeeun Yang, Uiwang-si (KR); Heechul Jung, Gunpo-si (KR); Jinsoo Mun, Seoul (KR)

(73) Assignees: SAMSUNG ELECTRONICS CO., LTD., Gyeonggi-Do (KR); SAMSUNG SDI CO., LTD., Gyeonggi-Do (KR)

(*) Notice: Subject to any disclaimer, the term of this patent is extended or adjusted under 35 U.S.C. 154(b) by 21 days.

This patent is subject to a terminal disclaimer.

(21) Appl. No.: 14/985,544

(22) Filed: Dec. 31, 2015

(65) Prior Publication Data
US 2016/0190568 A1    Jun. 30, 2016

(30) Foreign Application Priority Data
Dec. 31, 2014  (KR) .................. 10-2014-0195608

(51) Int. Cl.
*H01M 4/36* (2006.01)
*H01M 10/0525* (2010.01)
*H01M 4/38* (2006.01)
*H01M 4/42* (2006.01)
*H01M 4/46* (2006.01)
*H01M 4/62* (2006.01)
*H01M 10/052* (2010.01)

(52) U.S. Cl.
CPC .......... *H01M 4/366* (2013.01); *H01M 4/364* (2013.01); *H01M 4/386* (2013.01); *H01M 4/624* (2013.01); *H01M 4/625* (2013.01); *H01M 10/052* (2013.01)

(58) Field of Classification Search
CPC combination set(s) only.
See application file for complete search history.

(56) References Cited

U.S. PATENT DOCUMENTS

| | | | |
|---|---|---|---|
| 6,377,030 B1* | 4/2002 | Asao | H01M 10/052 320/161 |
| 8,608,983 B2 | 12/2013 | Lee et al. | |
| 9,123,952 B2 | 9/2015 | Kim et al. | |
| 2006/0216606 A1* | 9/2006 | Kim | H01M 4/0471 429/232 |
| 2007/0285246 A1* | 12/2007 | Koyama | G06F 1/263 340/572.1 |

(Continued)

FOREIGN PATENT DOCUMENTS

| | | |
|---|---|---|
| KR | 1020100112442 | 10/2010 |
| KR | 1020130033251 | 4/2013 |

(Continued)

*Primary Examiner* — Kaity V Chandler
(74) *Attorney, Agent, or Firm* — Cantor Colburn LLP (57) ABSTRACT

A composite anode active material includes a metal silicide core, a silicon shell, and a metal nitride and a carbon material that are dispersed in at least one surface of the silicon shell.

15 Claims, 10 Drawing Sheets

(56) References Cited

U.S. PATENT DOCUMENTS

| | | | |
|---|---|---|---|
| 2011/0143019 A1* | 6/2011 | Mosso | C23C 16/0209 427/58 |
| 2011/0159365 A1* | 6/2011 | Loveness | H01M 4/0428 429/218.1 |
| 2011/0200874 A1* | 8/2011 | Ono | H01M 4/134 429/213 |
| 2011/0215280 A1 | 9/2011 | Obrovac et al. | |
| 2012/0227807 A1* | 9/2012 | Kato | H01L 51/447 136/257 |
| 2014/0127558 A1 | 5/2014 | Kang et al. | |
| 2014/0178754 A1 | 6/2014 | Kim et al. | |
| 2016/0126544 A1* | 5/2016 | Fan | H01M 10/052 429/217 |

FOREIGN PATENT DOCUMENTS

| | | |
|---|---|---|
| KR | 1020140048761 | 4/2014 |
| KR | 1020140074739 | 6/2014 |
| KR | 1020140081679 | 7/2014 |

\* cited by examiner

COMPOSITE ANODE ACTIVE MATERIAL, METHOD OF PREPARING THE SAME, AND ANODE AND LITHIUM SECONDARY BATTERY INCLUDING THE COMPOSITE ANODE ACTIVE MATERIAL

CROSS-REFERENCE TO RELATED APPLICATION

This application claims priority to Korean Patent Application No. 10-2014-0195608, filed on Dec. 31, 2014, and all the benefits accruing therefrom under 35 U.S.C. § 119, the content of which in its entirety is herein incorporated by reference.

BACKGROUND

1. Field

Exemplary embodiments of the invention relate to a composite anode active material, a method of preparing the composite anode active material, and an anode including the composite anode active material, and a lithium secondary battery including the anode.

2. Description of the Related Art

Due to high energy density and convenience in design, lithium secondary batteries have served as a main source of electrical power of mobile electronic devices. An application of the lithium secondary battery using as a power source of an electrical vehicle or an electrical power storage device of renewable energy has been broadened. In order to correspond to such demand of the market, studies on materials of a lithium secondary battery having high energy density and long lifespan characteristics have been continuously conducted. Among anode materials, for example, studies on various materials such as silicon, tin, or germanium, as well as carbon have been conducted.

Among the anode materials, a silicon material has high energy density compared to that of a graphite material, which is commonly used as an anode active material.

SUMMARY

When a silicon material is used as an anode active material, an unstable solid electrolyte interface ("SEI") layer may be formed by a side reaction between a silicon surface and an electrolyte, which deteriorates electrochemical characteristics of the anode active material, or, due to internal stress caused by rapid volume expansion that occurs during a charging/discharging process, the silicon material may be pulverized. Therefore, a composite anode active material that may prevent formation of an SEI layer by suppressing a side reaction between a silicon surface and an electrolyte and may suppress rapid volume expansion that occurs during a charging/discharging process is needed.

Provided is a composite anode active material, where volume change caused by intercalation/deintercalation of lithium ions is decreased, and a side reaction by contact with an electrolyte is suppressed, a method of preparing the composite anode active material, an anode including the composite anode active material, and a lithium secondary battery including the anode.

Additional exemplary embodiments will be set forth in part in the description which follows and, in part, will be apparent from the description, or may be learned by practice of the presented exemplary embodiments.

According to an exemplary embodiment, a composite anode active material includes a metal silicide core, a silicon shell, and a metal nitride and a carbon material that are dispersed in at least one surface of the silicon shell.

According to another exemplary embodiment, a method of preparing the composite anode active material includes milling a metal silicide, and heat-treating the milled metal silicide in a nitrogen atmosphere, and combining the heat-treated resultant and a carbon material to obtain a combination and then milling the combination.

According to another exemplary embodiment, an anode including the composite anode active material may further include a carbon material.

According to another exemplary embodiment, a lithium secondary battery includes the anode.

BRIEF DESCRIPTION OF THE DRAWINGS

These and/or other exemplary embodiments will become apparent and more readily appreciated from the following description of the exemplary embodiments, taken in conjunction with the accompanying drawings in which.

DETAILED DESCRIPTION

Reference will now be made in detail to exemplary embodiments of a composite anode active material, a method of preparing the composite anode active material, an anode including the composite anode active material, and a lithium secondary battery including the anode, and examples of which are illustrated in the accompanying drawings where like reference numerals refer to like elements throughout. In this regard, the exemplary embodiments may have different forms and should not be construed as being limited to the descriptions set forth herein. Accordingly, the exemplary embodiments are merely described below, by referring to the figures, to explain exemplary embodiments. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

According to an exemplary embodiment, a composite anode active material includes a metal silicide core, a silicon shell, and a metal nitride and a carbon material that are dispersed on least one surface of the silicon shell.

The metal nitride on a surface of the silicon shell blocks direct contact between silicon and an electrolyte so that formation of a solid electrolyte interface ("SEI") layer on the silicon shell may be suppressed, and a conductive pathway may be disposed on the silicon along with the carbon material, which may improve electrochemical characteristics of the composite anode active material. As a result, a rate and lifespan characteristics of the lithium secondary battery including the composite anode active material is improved. Also, the metal silicide in the core physically binds with silicon particles, and thus the silicon particles of the silicon shell being pulverized due to the internal stress may be prevented.

As used herein, the composite anode active material is an anode active material that is prepared by bonding at least two materials having different physical or chemical properties, where characteristics of the composite anode active material are different from those of each of the materials that constitute the composite anode active material, and the materials are distinctive in macro or micro scales in the final structure.

As used herein, the core and the shell are not strictly limited to a case when a silicon shell completely surrounds a metal silicide core, and may include a case when silicon surrounds a part of a metal silicide.

In an exemplary embodiment, the carbon material may include, for example, at least one of carbon nanotubes ("CNTs"), graphites, carbon fibers, and graphene. In an exemplary embodiment, CNTs may be, for example, single-wall CNTs, multi-wall CNTs, or combination thereof. In an exemplary embodiment, for example, an average aspect ratio of the CNTs may be about 300 or less, or, for example, about 250 or less, or, for example, in a range about 50 to about 200.

The term "average aspect ratio" used herein refers to a ratio of average length to average diameter (average length/average diameter ratio), "average diameter" is an average value of diameters of the thickest parts of at least 10 CNTs observed by using a scanning electron microscope, and "average length" is an average value of lengths of the lengths of at least 10 CNTs observed by using a SEM.

In an exemplary embodiment, an average diameter of the CNTs may be in a range of, for example, about 1 nanometer (nm) to about 50 nm. When the average diameter of the CNTs is within this range above, the CNTs are evenly arranged on at least one surface of the silicon sell, and thus electrical conductivity of the silicon shell may improve, which may result in improvement in charging/discharging rate characteristics of a lithium secondary battery.

The CNTs may optionally undergo an activation treatment. Here, the activation treatment may be performed by treating commercially available CNTs with at least one of acids such as nitric acid or sulfuric acid and oxidizing agents such as potassium permanganate and with ultrasound waves, for example. When the CNTs undergo such activation treatment, conductivity of the CNTs may improve.

In an exemplary embodiment, an amount of the carbon material may be, for example, in a range of about 1 part to about 70 parts by weight, or, for example, about 1 part to about 50 parts by weight, based on 100 parts by weight of the total weight of the composite anode active material, but the amount of the carbon material is not limited thereto. When the amount of the carbon material is within this range, an anode having excellent durability may be manufactured without deterioration in electrochemical characteristics of the anode.

Figure 1A:
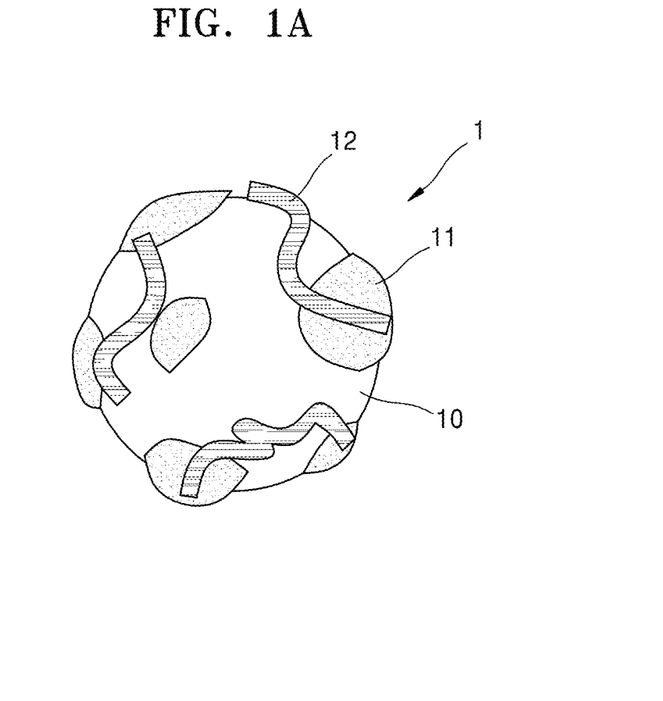
FIG. 1A is a schematic view of a structure of an exemplary embodiment of a composite anode active material.

FIG. 1A is a schematic view of a structure of an anode active material 1 according to an exemplary embodiment.

Referring to FIG. 1A, the composite anode active material 1 has a structure including a metal nitride, e.g., a titanium nitride 11, and a carbon material 12, e.g., CNTs, that are dispersed on at least one surface of a silicon anode active material 10.

Figure 1B:
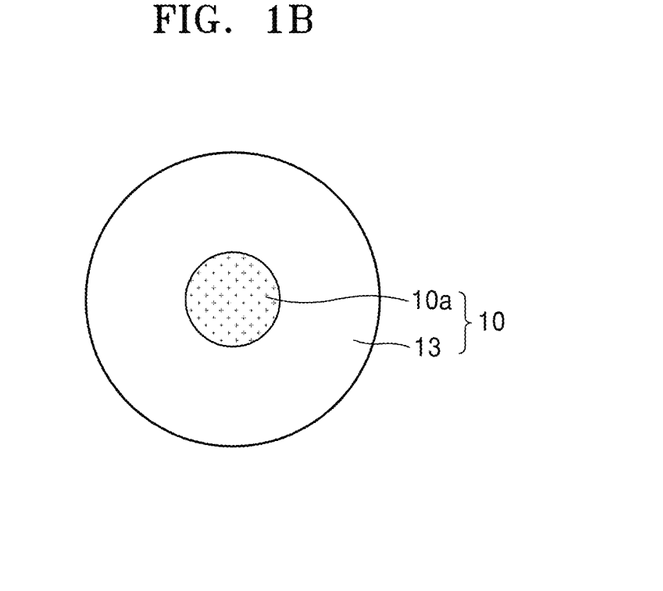
FIG. 1B is a schematic view of a structure of a silicon anode active material in the composite anode active material shown in FIG. 1A.

FIG. 1B is a schematic view of a structure of the silicon anode active material 10 shown in FIG. 1A.

Referring to FIG. 1B, the silicon anode active material 10 has a structure in which a metal silicide 10a, e.g., a titanium silicide ($TiSi_2$) is in a core, and silicon particles 13 surround the core.

Hereinafter, functional effect of an anode including the composite anode active material according to an exemplary embodiment will be described.

Figure 2A:
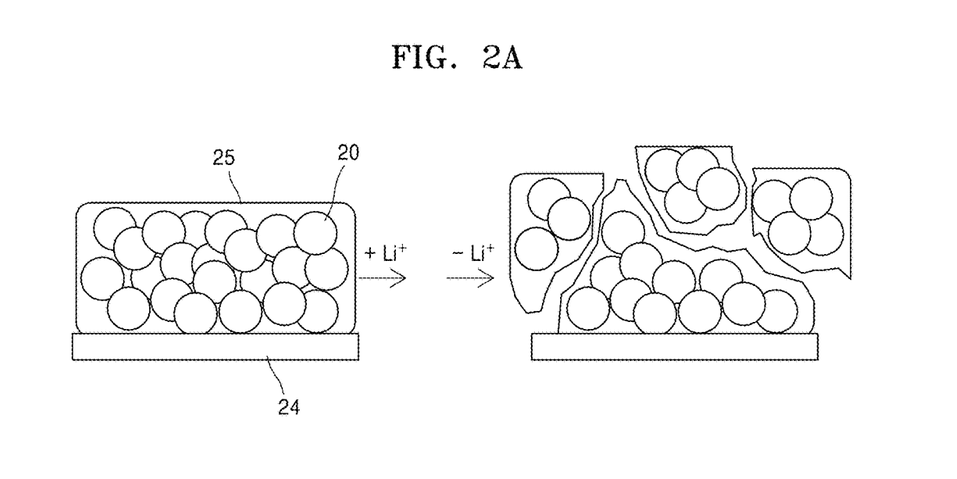
FIG. 2A illustrates a change in an anode using a conventional anode active material according to intercalation and deintercalation of lithium.

FIG. 2A illustrates a change in an anode using a conventional silicon anode active material 20 according to intercalation and deintercalation of lithium.

Referring to FIG. 2A, in the anode using the silicon anode active material 20, when lithium intercalates into or deintercalates from an anode active material layer 25 disposed on a current layer 24, a volume of the silicon anode active material 20 expands as silicon therein reacts with lithium and then provides an alloy. Thus, an electrical contact of the active material between the anode active materials is lost as the active material is pulverized due to the internal stress. Here, the internal stress is caused by the volume expansion of the silicon anode active material 20. As a result, a capacity of the anode may be deceased, and the anode may be destructed.

Figure 2B:
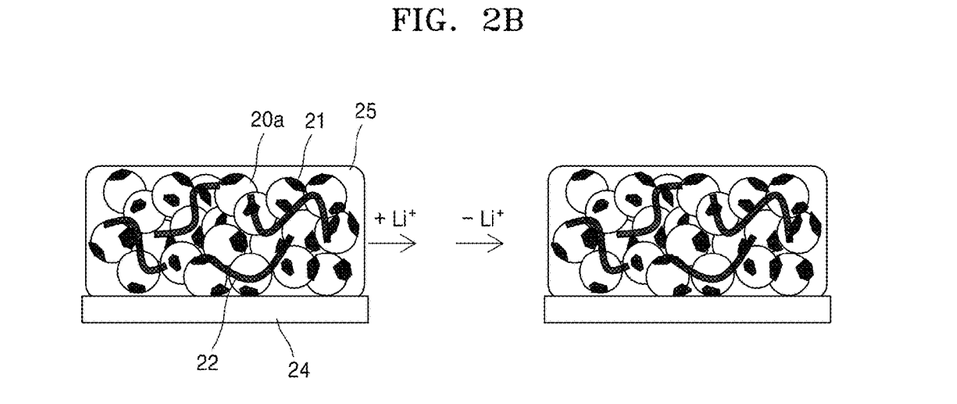
FIG. 2B illustrates a change in an anode using an exemplary embodiment of the anode active material according to intercalation and deintercalation of lithium.

On the contrary, referring to FIG. 2B, when the composite anode active material according to an exemplary embodiment is used, the metal nitride 21, such as a titanium silicide, is provided in the form of an inert film with respect to lithium on the silicon material 20a, and thus a reaction between the anode active material and an electrolyte may be suppressed, and pulverization of silicon particles due to the volume change of silicon particles may be prevented, which may improve lifespan characteristics of a battery. Also, since the metal nitride has conductivity, the composite anode active material including metal nitride has increased rate capability in terms of electrochemical characteristics. Further, the carbon material 22, for example, CNTs, may serve as electrical pathways, and thus electrical contact of the composite anode active material may be maintained at improved state. In this regard, since the electrical pathways may be connected by the carbon material, electrical isolation of the anode active material at which partially deterioration may occur may be prevented. As a result, electrochemical characteristics of the anode may be excellent, and a structure of the anode active material layer 25 may be maintained stable, which may improve durability of an anode including the anode active material and a lithium secondary battery including the anode.

The metal nitride being dispersed on a surface of the silicon shell may include a case when a metal nitride provides an even coating layer on a shell surface or the metal nitride existing in the form of discontinuous coating layer such as islands, as well as a part of metal nitride particles being embedded in silicon particles.

The metal nitride and the carbon material may exist in a coating layer disposed on at least one surface of the silicon shell. The coating layer may, for example, completely cover the silicon shell. The coating layer may be a continuous layer or a discontinuous layer in the form of islands.

In an exemplary embodiment, a thickness of the coating layer may be in a range of about 1 nm to about 200 nm, or, for example, about 30 nm to about 200 nm. When a composite anode active material including the coating layer is used, a side reaction of the anode active material and an electrolyte may be suppressed, and an anode having improved electrochemical characteristics and durability may be manufactured.

In exemplary embodiments, the metal silicide and the metal nitride may include the same metal. In an exemplary embodiment, the metal silicide and the metal nitride may include at least one metal of titanium (Ti), vanadium (V), copper (Cu), zinc (Zn), molybdenum (Mo), nickel (Ni), aluminum (Al), calcium (Ca), magnesium (Mg), iron (Fe), and chrome (Cr).

In an exemplary embodiment, the metal silicide may include at least one of, for example, calcium silicide ($CaSi_2$), magnesium silicide ($Mg_2Si$), copper silicide ($Cu_3Si$), nickel silicide (NiSi), and iron silicide (FeSi).

In an exemplary embodiment, the metal silicide may be $TiSi_x$ (where, $0<x\leq2$).

The metal silicide may be nanoparticle or microparticles. In an exemplary embodiment, an average particle diameter of the metal silicide nanoparticle may be in a range of about 10 nm to about 500 nm, and an average particle diameter of the metal silicide microparticles may be in a range of about 100 nm to about 1 micrometer (μm), for example.

In an exemplary embodiment, the metal nitride may be, for example, TiN or CrN.

In an exemplary embodiment, an amount of the metal nitride may be about 0.5 mol or less, or, for example, in a range of about 0.01 mol to about 0.5 mol based on 1 mol of silicon of the silicon shell.

In an exemplary embodiment, an amount of the metal silicide may be about 0.5 mol or less, or, for example, in a range of about 0.01 mol to about 0.5 mol based on 1 mol of silicon of the silicon shell.

Figure 2C:
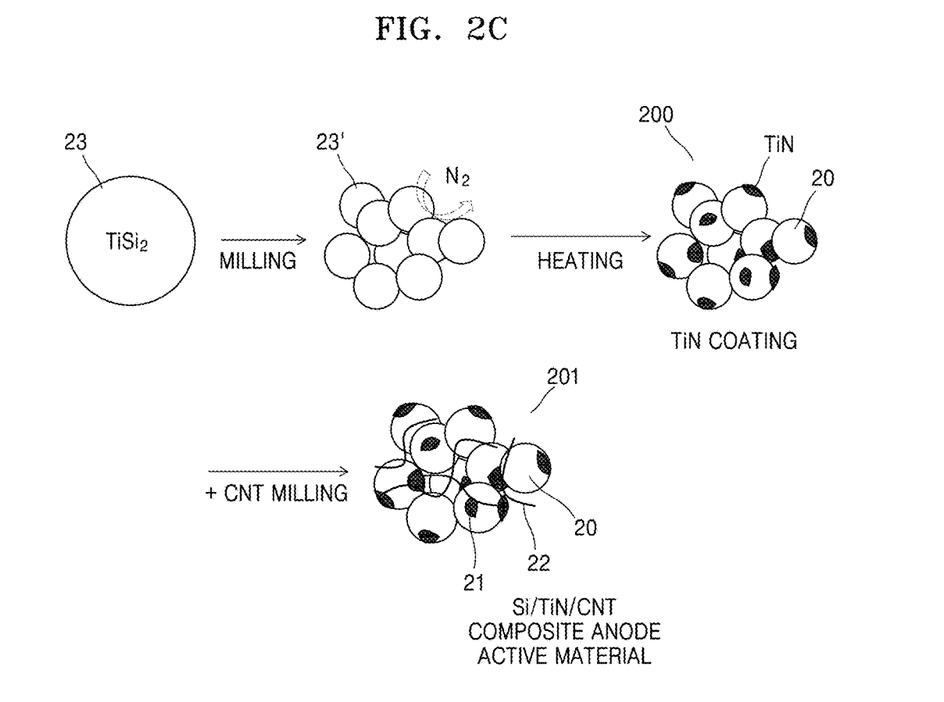
FIG. 2C illustrates an exemplary embodiment of a process of preparing the composite anode active material.

Hereinafter, referring to FIG. 2C, a method of preparing a composite anode active material according to another exemplary embodiment will be described. In FIG. 2C, a titanium silicide ($TiSi_2$) is used as an unlimited example of a metal silicide 23.

First, a milling process is performed on the titanium silicide ($TiSi_2$) 23. In an exemplary embodiment, for example, the milling process may be performed for about 0.5 hour to about 12 hours. When the milling time is within this range, a process of phase separation from the titanium silicide ($TiSi_2$) to silicon and a titanium nitride may be rapidly performed.

A device used in the milling process is not particularly limited, and any device available for milling in the art may be used. In an exemplary embodiment, a spex mill or a planetary mill may be used, for example.

In an exemplary embodiment, the milled titanium silicide ($TiSi_2$) 23' is heat-treated in a nitrogen atmosphere at a temperature in a range of about 800 degrees Celsius (° C.) to about 1200° C., or, for example, about 1050° C. to about 1150° C. In an exemplary embodiment, the heat-treatment may be performed, for example, for about 0.5 hour to about 5 hours.

Through the heat-treatment, the titanium silicide may be phase separated into silicon and titanium nitride (TiN), and thus an anode active material 200 including a metal silicide core, such as a titanium silicide (TiSi$_2$), a silicon shell, and a metal nitride such as TiN dispersed on a surface of the silicon shell may be obtained.

The carbon material (e.g., CNTs) is combined and milled to the anode active material 200. Through the milling process, a target composite anode active material 201 including a silicon anode active material 20 having a metal silicide (e.g., TiSi$x$, where 0<x≤2) core and a silicon shell, and a metal nitride (e.g., TiN) 21, and a carbon material (e.g., CNT) 22 on at least one surface of the silicon anode active material is obtained.

In an exemplary embodiment, the milling time of the anode active material and the carbon material is 120 minutes or less, for example, 60 minutes or less, or 10 minutes or less, or in a range of about 1 minute to about 8 minutes. When the milling time is within this range, the CNT being pulverized into too small size may be prevented, and thus a lithium secondary battery having improved initial efficiency and lifespan may be manufactured.

The milling device may be a milling device that may be applied to mill the metal silicide. Also, the milling process may be performed by wet milling using a solvent in addition to dry milling.

Before performing the milling of the anode active material and the carbon material, a process of sonication or stirring of an organic solvent, a carbon material 22, and an anode active material 200 may be performed. After the sonication process or the stirring process, the milling process is performed by undergoing a process of removing an organic solvent. When the process of the sonication or stirring is performed, the carbon material or the metal nitride may be improved dispersibility in the composite anode active material.

Examples of the organic solvent may include N-methylpyrrolidone.

In the Raman spectrum, a D/G intensity ratio of the composite anode active material is in a range of about 0.2 to about 0.4, which is higher than that of a D/G intensity ratio of a general carbon material. When the composite anode active material has the D/G intensity ratio, the composite anode active material may have excellent electrochemical characteristics and durability.

A peak at about 1350 inverse centimeters (cm$^{-1}$) to about 1450 cm$^{-1}$ is a peak referred to as "D mode", which appears when there is a defect in a sp$^2$ crystal structure, and a peak at about 1520 cm$^{-1}$ to about 1675 cm$^{-1}$ is a peak referred to as "G mode", which is caused by a vibration mode corresponding to stretching of a carbon-carbon bond. A D/G intensity ratio provides information about disorder and existence of defects.

Also, whether the composite anode active material including Si, TiN, and TiSi$_2$ phase or not may be confirmed by X-ray diffraction analysis.

The Si-phase may be confirmed by peaks found in a 2θ region of about 28° to about 29°, about 43° to about 44°, and about 56° to about 57°, and the TiN-phase may be confirmed by peak found in a 2θ region of about 36° to about 37°, about 41° to about 42°, and about 61° to about 62°. Also, the TiSi$_2$-phase may be confirmed by a peak found in a 2θ region of about 38° to about 39°.

According to another exemplary embodiment of an embodiment, the composite anode active material includes a porous metal silicide phase, a silicon phase, and a metal nitride phase and a carbon material. Metal nitride phase and a carbon material may be dispersed on the silicon surface or on an interface between the metal silicide phase and the silicon phase.

The porous metal silicide (e.g., titanium silicide) exists inside of the composite anode active material, and silicon exists around the metal silicide.

The metal nitride (e.g., a titanium nitride) and a carbon material exist on the silicon surface or on an interface between silicon and the metal silicide.

In an exemplary embodiment, a porosity of the porous metal silicide may be in a range of about 1% to about 10%, for example.

In an exemplary embodiment, the porous metal silicide and the metal nitride may include the same metal.

The composite anode active material according to another embodiment includes a metal silicide in the center part of the composite anode active material particle and the metal silicide physically bonds with silicon particles. Thus the metal silicide may function as a buffer that eases an internal stress that generates during volume expansion. As a result, the composite anode active material may prevent pulverization between silicon particles and may provide free space for volume expansion by the pores in the metal silicide. Therefore, deterioration of an electrode caused by the volume change may be reduced.

The composite anode active material may be prepared by selectively treating the composite anode active material including a metal silicide core, a silicon shell, and a metal nitride and a carbon material that are dispersed on at least one surface of the silicon shell with an etching agent.

When the composite anode active material is selectively treated with an etching agent, the metal silicide is selectively etched, and thus pores may be provided. The selective etching agent may include at least one of HF and HCl, for example.

The treating with a selective etching agent may be performed until the metal silicide is completely etched. In an exemplary embodiment, the heat-treatment may be performed at a temperature in a range of about 800° C. to about 1200° C., for example.

According to another exemplary embodiment, an anode including the composite anode active material is provided. The composite anode active material includes a porous metal silicide having pores, and thus the porous metal silicide having pores may function as a buffer that may compensate during expansion and contraction of an anode active material during a charging/discharging process, and thus pulverization of the anode active material may be prevented, and an amount of silicon in the anode active material due to the pores may relatively increase, which may result in an increase in a capacity of a lithium secondary battery.

In the preparation of the anode, the composite anode active material may further include a carbon material. The carbon material is not particularly limited, and any material available as a carbon material in the art may be used. In an exemplary embodiment, the carbon material may include at least one of natural graphite, artificial graphite, expanded graphite, graphene, carbon black, CNTs, and carbon fibers and graphene, for example. In an exemplary embodiment, in the composite anode active material, an amount of the carbon material may be, for example, in a range of about 1 part to about 80 parts by weight, or, for example, about 5 parts to about 50 parts by weight, based on 100 parts by weight of the total weight of the composite anode active material The anode according to another exemplary embodiment includes the composite anode active material. In an exemplary embodiment, the anode may be manufactured by molding an anode active material composition including the composite anode active material in a predetermined shape or coating the anode active material composition on a current collector such as a copper foil, for example.

An anode active material composition is prepared by combining (e.g., mixing) the composite anode active material, a conducting agent, a binder, and a solvent. The anode active material composition is directly coated on a metal current collector to prepare an anode plate. In an alternative exemplary embodiment, the anode active material composition is cast on a separate support, and a film detached from the separate support is laminated on a metal current collector to prepare an anode plate. The anode is not limited to the type described above, and any type of an anode may be used.

The conducting agent may be, for example, acetylene black, Ketjen black, natural black, artificial black, carbon black, carbon fibers, a metal powder or metal fiber of copper, nickel, aluminum, or silver, one type or a combination of conductive polymer such as a polyphenylene derivative, but embodiments are not limited thereto, and any material available as a conducting agent may be used. Also, a crystalline carbon material may be added as a conducting agent.

Examples of the binder may include vinylidene fluoride/hexafluoropropylene copolymer, polyvinylidene fluoride (PVdF), polyacrylonitrile, polymethylmethacrylate, polyacrylic acid, polyamideimide, polytetrafluoroethylene, and a combination thereof, or a styrene butadiene rubber polymer, but embodiments are not limited thereto, and any material available as a binder in the art may be used.

Examples of the solvent may include N-methylpyrrolidone ("NMP"), acetone, and water, but embodiments are not limited thereto, and any material available as a solvent in the art may be used.

Amounts of the composite anode active material, the conducting agent, the binder, and the solvent may be at the same levels used in a conventional lithium secondary battery. At least one of the conducting agent, the binder, and the solvent may be omitted depending on a use or a structure of the lithium battery.

According to another exemplary embodiment, a lithium secondary battery includes an anode including the composite anode active material. The lithium secondary battery is prepared as follows.

First, an anode is prepared according to the anode preparation method.

Then, a cathode active material, a conducting agent, a binder, and a solvent are combined to prepare a cathode active material composition. The cathode active material composition is directly coated and dried on a metal current collector to prepare a cathode plate. In an alternative exemplary embodiment, the cathode active material composition is cast on a separate support, and a film detached from the separate support is laminated on a metal current collector to prepare a cathode plate.

In an exemplary embodiment, the cathode active material may include at least one of a lithium cobalt oxide, a lithium nickel cobalt manganese oxide, a lithium nickel cobalt aluminum oxide, a lithium iron phosphate, and a lithium manganese oxide, for example, but embodiments are not limited thereto, and any material available as a cathode active material in the art may be used.

In an exemplary embodiment, the cathode active material may be represented by one of $Li_aA_{1-b}B_bD_2$ (where, $0.90 \leq a \leq 1.8$ and $0 \leq b \leq 0.5$), $Li_aE_{1-b}B_bO_{2-c}D_c$ (where, $0.90 \leq a \leq 1.8$, $0 \leq b \leq 0.5$, and $0 \leq c \leq 0.05$), $LiE_{2-b}B_bO_{4-c}D_c$ (where, $0 \leq b \leq 0.5$ and $0 \leq c \leq 0.05$), $Li_aNi_{1-b-c}Co_bB_cD_\alpha$ (where, $0.90 \leq a \leq 1.8$, $0 \leq b \leq 0.5$, $0 \leq c \leq 0.05$, and $0 < \alpha < 2$), $Li_aNi_{1-b-c}Co_bB_cO_{2-\alpha}F_\alpha$ (where, $0.90 \leq a \leq 1.8$, $0 \leq b \leq 0.5$, $0 \leq c \leq 0.05$, and $0 < \alpha < 2$), $Li_aNi_{1-b-c}Co_bB_cO_{2-\alpha}F_2$ (where, $0.90 \leq a \leq 1.8$, $0 \leq b \leq 0.5$, $0 \leq c \leq 0.05$, and $0 < \alpha < 2$), $Li_aNi_{1-b-c}Mn_bB_cD_\alpha$ (where, $0.90 \leq a \leq 1.8$, $0 \leq b \leq 0.5$, $0 \leq c \leq 0.05$, and $0 < \alpha \leq 2$), $Li_aNi_{1-b-c}Mn_bB_cO_{2-\alpha}F_\alpha$ (where, $0.90 \leq a \leq 1.8$, $0 \leq b \leq 0.5$, $0 \leq c \leq 0.05$, and $0 < \alpha < 2$), $Li_aNi_{1-b-c}Mn_bB_cO_{2-\alpha}F_2$ (where, $0.90 \leq a \leq 1.8$, $0 \leq b \leq 0.5$, $0 \leq c \leq 0.05$, and $0 < \alpha < 2$), $Li_aNi_bE_cG_dO_2$ (where, $0.90 \leq a \leq 1.8$, $0 \leq b \leq 0.9$, $0 \leq c \leq 0.5$, and $0.001 \leq d \leq 0.1$), $Li_aNi_bCo_cMn_dGeO_2$ (where, $0.90 \leq a \leq 1.8$, $0 \leq b \leq 0.9$, $0 \leq c \leq 0.5$, $0 \leq d \leq 0.5$, and $0.001 \leq e \leq 0.1$), $Li_aNiG_bO_2$ (where, $0.90 \leq a \leq 1.8$ and $0.001 \leq b \leq 0.1$), $Li_aCoG_bO_2$ (where, $0.90 \leq a \leq 1.8$ and $0.001 \leq b \leq 0.1$), $Li_aMnG_bO_2$ (where, $0.90 \leq a \leq 1.8$ and $0.001 \leq b \leq 0.1$), $Li_aMn_2G_bO_4$ (where, $0.90 \leq a \leq 1.8$ and $0.001 \leq b \leq 0.1$), $QO_2$, $V_2O_5$, $LiV_2O_5$, $LiIO_2$, $LiNiVO_4$, $Li_{(3-f)}J_2(PO_4)_3$ (where, $0 \leq f \leq 2$), $Li_{(3-f)}Fe_2(PO_4)_3$ (where, $0 \leq f \leq 2$), and $LiFePO_4$, for example.

In the formulae above, A is Ni, Co, Mn, or a combination thereof, B is Al, Ni, Co, Mn, Cr, Fe, Mg, Sr, V, a rare-earth element, or a combination thereof, D is O, F, S, P, or a combination thereof, E is Co, Mn, or a combination thereof, F is F, S, P, or a combination thereof, G is Al, Cr, Mn, Fe, Mg, La, Ce, Sr, V, or a combination thereof, Q is Ti, Mo, Mn, or a combination thereof, I is Cr, V, Fe, Sc, Y, or a combination thereof, and J is V, Cr, Mn, Co, Ni, Cu, or a combination thereof.

The combination may have a coating layer on a surface thereof, or the combination may be combined with a combination having a coating layer. In an exemplary embodiment, the coating layer may include an oxide, a hydroxide an oxyhydroxide, an oxycarbonate, or an hydroxycarbonate of a coating element combination. A combination that provides the coating layer may be amorphous or crystalline. In an exemplary embodiment, the coating element included in the coating layer may be Mg, Al, Co, K, Na, Ca, Si, Ti, V, Sn, Ge, Ga, B, As, Zr, or a combination thereof. A process of forming the coating layer may be any coating method that does not affect physical properties of a cathode active material (e.g., spray coating or dipping) using the element in the combinations, and this may be well understood by those skilled in the art, and thus description thereof will be omitted.

In an exemplary embodiment, $LiNiO_2$, $LiCoO_2$, $LiMn_xO_{2x}$ (x=1 or 2), $LiNi_{1-x}Mn_xO_2$ ($0<x<1$), $LiNi_{1-x-y}Co_xMn_yO_2$ ($0 \leq x \leq 0.5$, $0 \leq y \leq 0.5$), $LiFeO_2$, $V_2O_5$, TiS, or MoS may be used, for example.

In the preparation of the cathode active material composition, a conducting agent, a binder, and a solvent are the same as those used in the preparation of the anode active material composition. Also, a plasticizer may be further added to the cathode active material composition and/or the anode active material composition to provide pores in an electrode plate.

Amounts of the cathode active material, the conducting agent, the binder, and the solvent may be at the same levels used in a conventional lithium secondary battery. At least one of the conducting agent, the binder, and the solvent may be omitted depending on a use or a structure of the lithium battery.

Then, a separator that is to be interposed between the cathode and the anode is prepared. The separator may be any one of various separators conventionally used in a lithium battery. The separator may have a low resistance to ion flow and a high electrolytic solution-retaining capability.

Examples of the separator are glass fiber, polyester, Teflon, polyethylene ("PE"), polypropylene, polytetrafluoroethylene ("PTFE"), and a combination thereof, and these separators may be in a non-woven or woven fabric form. In an exemplary embodiment, a separator suitable for a lithium ion battery may be a rollable separator including, for example, polyethylene or polypropylene, and a separator suitable for a lithium ion polymer battery may be a separator that has an excellent organic electrolytic solution-retaining capability. An example of a method of forming the separator will now be described in detail.

A polymer resin, a filler, and a solvent are combined to prepare a separator composition. The separator composition may be directly coated on an electrode and dried to provide a separator. In an alternative exemplary embodiment, the separator composition may be cast on a support, dried, and then separated from the support as a separator film and then the separator film may be laminated on an electrode, thereby forming a separator.

The polymer resin used in forming the separator may not be particularly limited and may be any one of various materials that are used as a binder of an electrode plate. Examples of the polymer are a vinylidenefluoride/hexafluoropropylene copolymer, polyvinylidenefluoride ("PVDF"), polyacrylonitrile, polymethylmethacrylate, and a combination thereof.

Then, an electrolyte is prepared.

The electrolyte may be an organic electrolytic solution. In addition, the electrolyte may instead be solid. Examples of the solid electrolyte are boron oxide and lithium oxynitride, but are not limited thereto. The solid electrolyte may be any one of various solid electrolytes used in the art. In an exemplary embodiment, the solid electrolyte may be disposed on the anode by, for example, sputtering.

In an exemplary embodiment, an organic electrolytic solution may be prepared, for example. The organic electrolytic solution may be prepared by dissolving a lithium salt in an organic solvent.

The organic solvent may be any one of various organic solvents used in the art. Examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropylcarbonate, dipropyl carbonate, dibutyl carbonate, fluoroethylene carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, 1,2-dimethoxyethane, sulfolane, dichloroethane, chlorobenzene, nitrobenzene, diethyleneglycol, dimethylether, and a combination thereof.

The lithium salt may be any one of various lithium salts used in the art. Examples of the lithium salt are $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where, each of x and y is a natural number), LiCl, LiI, and a combination thereof.

Figure 3:
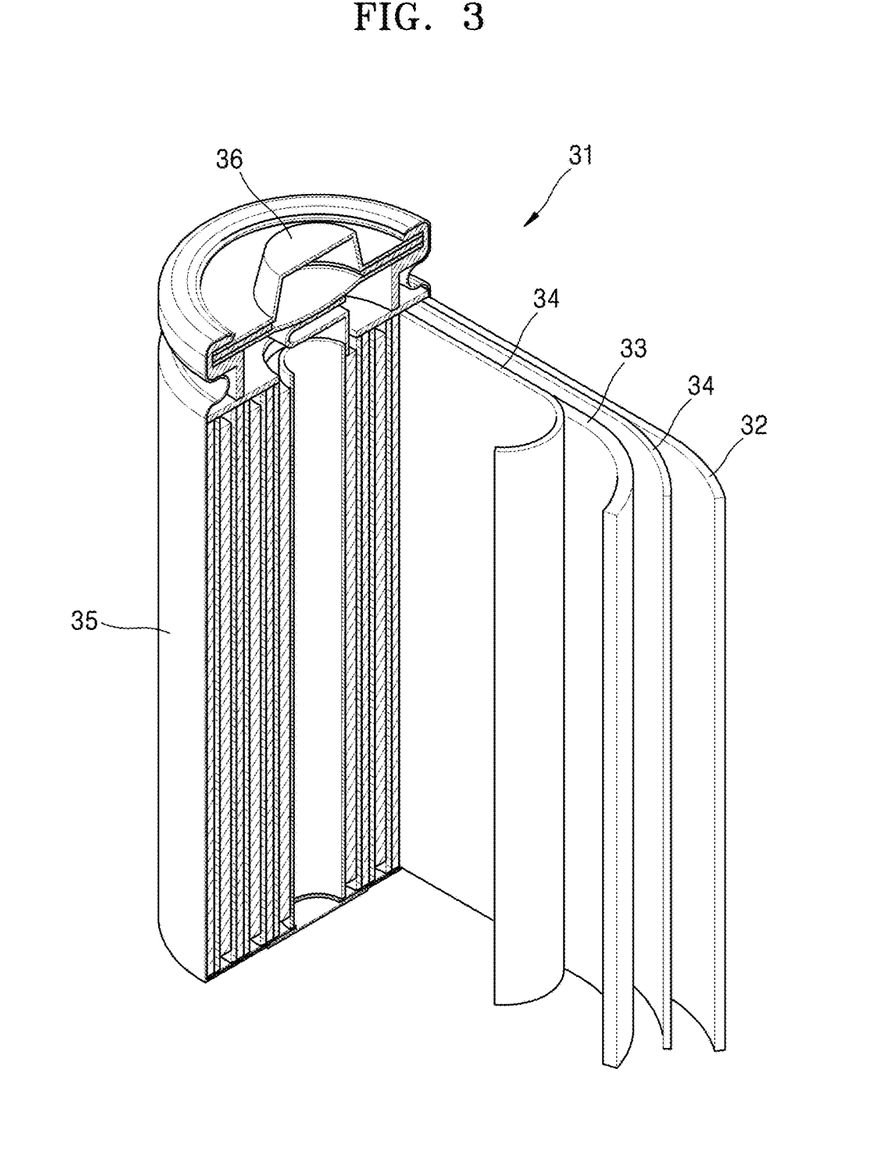
FIG. 3 is a schematic view of another exemplary embodiment of a lithium secondary battery.

As shown in FIG. 3, a lithium secondary battery 31 includes a cathode 33, an anode 32, and a separator 34. The cathode 33, the anode 32, and the separator 34 are wound or folded, and then accommodated in a battery case 35. Subsequently, an electrolyte is injected into the battery case 35, and the battery case 35 is sealed by a cap assembly 36, thereby completing the manufacture of the lithium secondary battery 31. In exemplary embodiments, the battery case 35 may have a cylindrical shape, a rectangular shape, or a thin-film shape, for example.

A battery assembly may be provided by interposing the separator between the cathode and the anode. The battery assemblies may be stacked into a bi-cell structure, impregnated into an organic electrolyte solution, and the resultant may be accommodated in a pouch and sealed to complete a lithium ion polymer battery.

A plurality of the battery assemblies may be stacked on each other to provide a battery pack, and the battery pack may be used in high-capacity and high-performance devices, such as a notebook computer, a smart phone, an electric vehicle ("EV"), etc.

One or more embodiments will now be described in more detail with reference to the following examples. However, these examples are not intended to limit the scope of the one or more embodiments.

Example 1: Preparation of Composite Anode Active Material 3 gram (g) of titanium silicide powder ($TiSi_2$) (LTS Chemical Inc.) was milled for 30 minutes by using a mechanical milling device (SPEX mill) to pulverize the titanium silicide particles to have an average particle diameter of about 300 nm. The pulverized resultant was heat-treated for about 1 hour in a nitrogen atmosphere at about 1100° C. to obtain a composite including a titanium silicide ($TiSi_2$), silicon (Si), and titanium nitride (TiN).

20 parts by weight of CNT was added to 80 parts by weight of the composite, and the combination was milled in the mechanical milling device (SPEX mill) for about 8 minutes to obtain a $TiSi_2$/Si/TiN/CNT composite anode active material having an average particle diameter of about 10 μm. In the composite anode active material thus obtained, a length of CNT was about 5 μm, and an average diameter of CNT was about 15 nm.

An amount of the titanium nitride (TiN) was about 0.3 mol based on 1 mol of silicon (Si), and an amount of titanium silicide ($TiSi_2$) was about 0.2 mol based on 1 mol of silicon (Si).

Comparative Example 1: Silicon (Si)

Only a silicon powder (having an average particle diameter of about 100 nm) that was obtained by pulverizing a silicon powder (having an average particle diameter of about 5 μm to about 10 μm) was used as an anode active material.

Manufacturing Example 1: Preparation of Anode and Coin-Half Cell

A composite anode active material prepared in Example 1, as an anode active material, Ketjen black (300JD), as a conducting agent, a NMP solution of lithium polyacrylate (LiPAA), as a binder, were combined in a mortar at a weight ratio of an anode active material:a binder=8:2 to prepare a slurry, the slurry was bar-coated on a copper foil (a thickness of about 15 μm) by using a doctor blade. The bar-coated product was primarily dried at a temperature of 80° C., pressed, and secondarily dried under high-temperature reduced-pressure condition (in vacuum, at 200° C., for 2 hours) to prepare an anode.

A lithium metal was used as a counter electrode of the anode. The anode and the lithium metal were stacked upon one another. An electrolyte was then injected into the resulting structure, thereby preparing a coin-half cell (CR2032 type).

The electrolyte used in the preparation of the coin-half cell was a 1.3 M LiPF6 solution dissolved in a solvent combination prepared by combining ethylene carbonate ("EC"), diethylene carbonate ("DEC"), and fluoroethylene carbonate ("FEC") at a volume ratio of 2:6:2, and a separator used therein was a polypropylene separator (Celgard 3501).

Manufacturing Example 2: Preparation of Anode and Coin-Half Cell

An anode and a coin-half cell were prepared in the same manner as in Manufacturing Example 1, except that a combination of the composite anode active material prepared in Example 1 and graphite at a weight ratio of 7:3 was used instead of the composite anode active material prepared in Example 1 was used.

Comparative Manufacturing Example 1: Preparation of Anode and Coin-Half Cell An anode and a coin-half cell were prepared in the same manner as in Manufacturing Example 1, except that the composite anode active material prepared in Comparative Example 1 was used instead of the composite anode active material prepared in Example 1 was used.

Evaluation Example 1: Scanning Electron Microscope ("SEM") Analysis

Figure 4A:
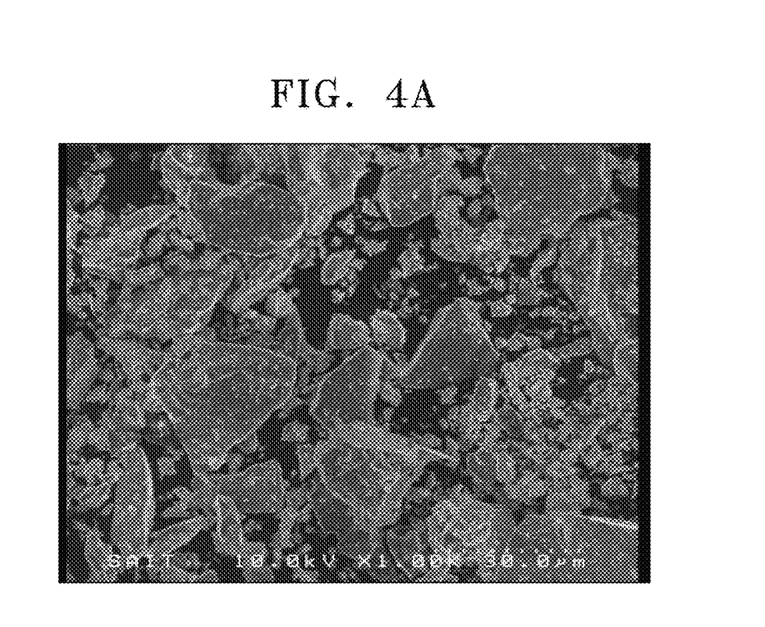
FIG. 4A is a scanning electron microscope ("SEM") image of titanium silicide, which is a starting material.
Figure 4B:
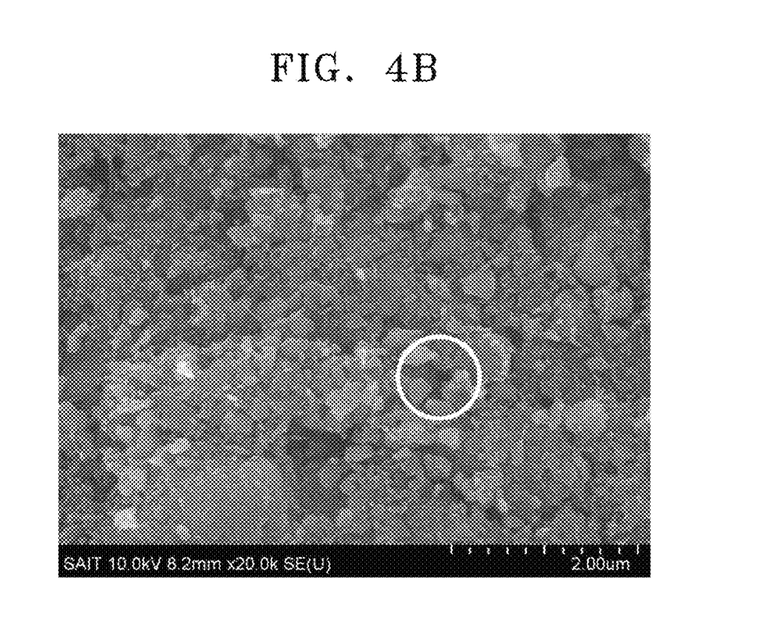
FIG. 4B shows the SEM image of a $TiSi_2/Si/TiN/CNT$ composite anode active material prepared in Example 1.
Figure 4C:
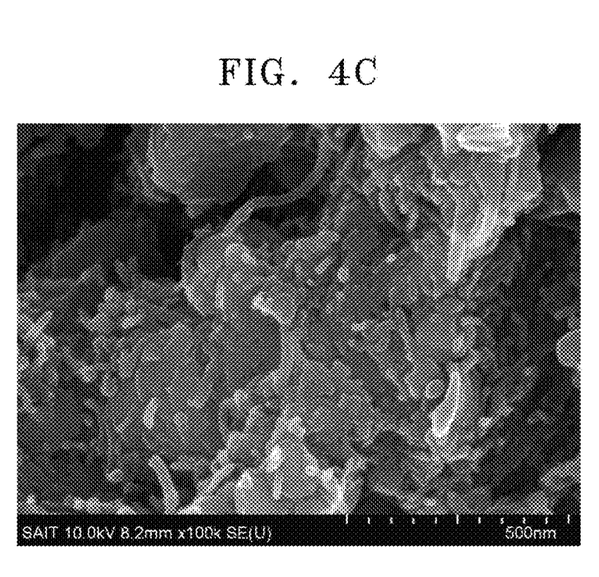
FIG. 4C is an SEM image of an enlarged view of a circled area in FIG. 4B.

SEM analysis was performed on the composite anode active material prepared in Example 1, and the results are shown in FIGS. 4A to 4C. The SEM analysis was performed by using S-5500 (available from Hitachi).

FIG. 4A is an SEM image of a titanium silicide, which is a starting material, FIG. 4B is an SEM image of a composite anode active material, and FIG. 4C is an enlarged view of a circled area in FIG. 4B.

Referring to FIGS. 4A to 4C, a shape of the composite anode active material prepared in Example 1 could have been confirmed.

Evaluation Example 2: X-Ray Diffraction Analysis

X-ray diffraction analysis was performed on the composite anode active material prepared in Example 1 by using a diffractometer, Rigaku RINT2200HF+, using Cu-Kα radiation of 1.54056 angstroms (Å).

Figure 5:
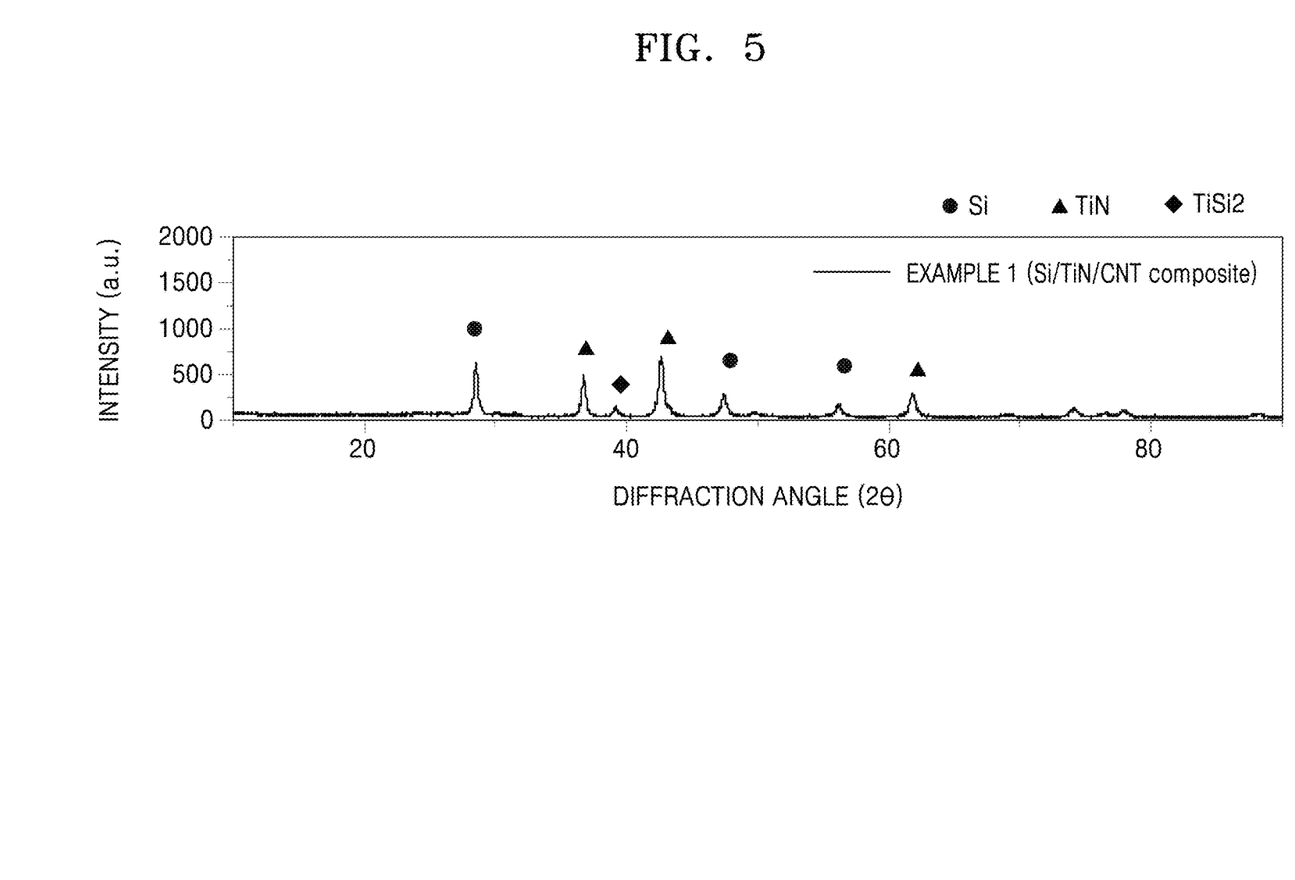
FIG. 5 shows an X-ray diffraction analysis of $TiSi_2/Si/TiN/CNT$ composite anode active material prepared in Example 1.

The results of the X-ray diffraction analysis are shown in FIG. 5.

Referring to FIG. 5, it may be confirmed that the composite anode active material maintains the Si, TiN, and $TiSi_2$ phases.

In the composite anode active material of Example 1, the existence of the Si-phase was confirmed by peaks found in a 2θ region of about 28° to about 29°, about 43° to about 44°, and about 56° to about 57°, and the TiN-phase was confirmed by peak found in a 2θ region of about 36° to about 37°, about 41° to about 42°, and about 61° to about 62°. Also, the $TiSi_2$-phase was confirmed by a peak found in a 2θ region of about 38° to about 39°.

Evaluation Example 3: Raman Analysis

Raman analysis was performed on the composite anode active material prepared in Example 1 and silicon of Comparative Example 1. The Raman analysis was performed by using Raman 2010 Spectra (NT-MDT Development Co.) (A laser system: 473, 633, and 785 nm, Lowest Raman shift: about 50 $cm^{-1}$, spatial resolution at about 500 nm).

Figure 6:
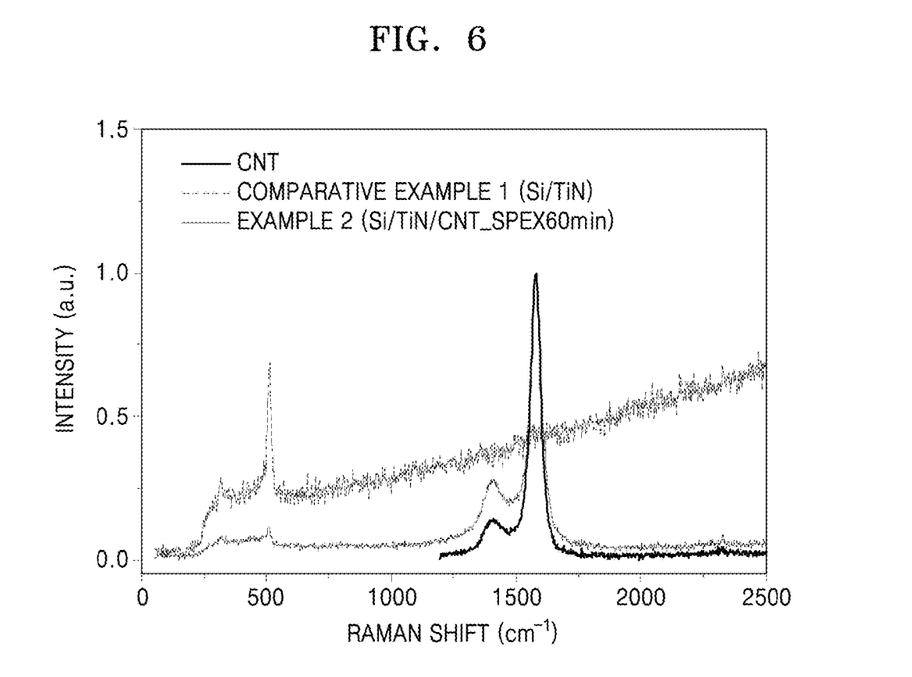
FIG. 6 is a Raman spectrum of the $TiSi_2/Si/TiN/CNT$ composite anode active material prepared in Example 1, carbon nanotubes ("CNTs"), and a silicon anode active material prepared in Comparative Example 1.
Figure 7:
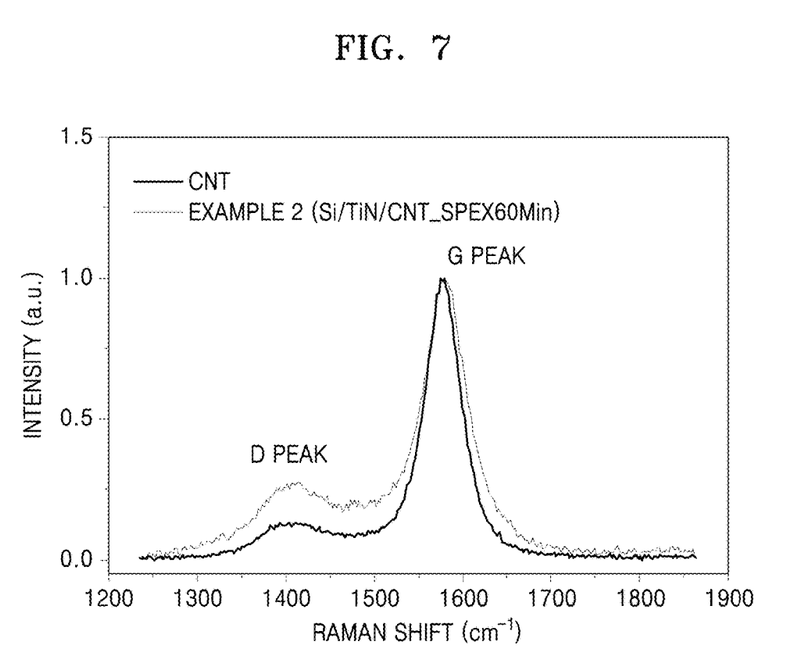
FIG. 7 is a Raman spectrum of the $TiSi_2/Si/TiN/CNT$ composite anode active material prepared in Example 1 and CNTs.

The results of the Raman analysis are shown in FIGS. 6 and 7. FIGS. 6 and 7 show the results of Raman analysis of CNT for the comparison with the composite anode active material of Example 1.

Referring to FIG. 6, the composite anode active material of Example 1 showed a typical peak pattern of carbon. Also, as shown in FIG. 7, the composite anode active material of Example 1 had a D/G intensity ratio increased compared to that of CNT. Such increase in the D/G intensity ratio denotes that the CNT has rupture surfaces by the milling, and thus arrangement in carbon atoms constituting the CNT may be changed (generating structural defects).

Evaluation Example 4: Charging/Discharging Characteristics

Charging/discharging characteristics of the coin-half cells prepared in Manufacturing Examples 1 and 2 and Comparative Manufacturing Example 1 were evaluated by using a charging/discharging device (model: TOYO-3100 available from TOYO). In the first cycle (n=1), each of the coin-half cells was charged at room temperature (25° C.) and a C-rate of 1 C (unit: milliampere-hours per gram (mA/g)) until a voltage was 0.01 V, and was discharged at a rate of 1 C until a voltage was 1.5 V. Then, the cell rested for 10 minutes. Subsequently, in the second cycle and cycles thereafter (n≥2), the cell was charged at room temperature (25° C.) and a rate of 1 C until a voltage was 0.01 V, and was discharged at a rate of 1 C until a voltage was 1.5 V. The cell underwent 100 cycles of the charging/discharging process (i.e., n=100).

Initial Efficiency and Charging/Discharging Characteristics

Figure 8:
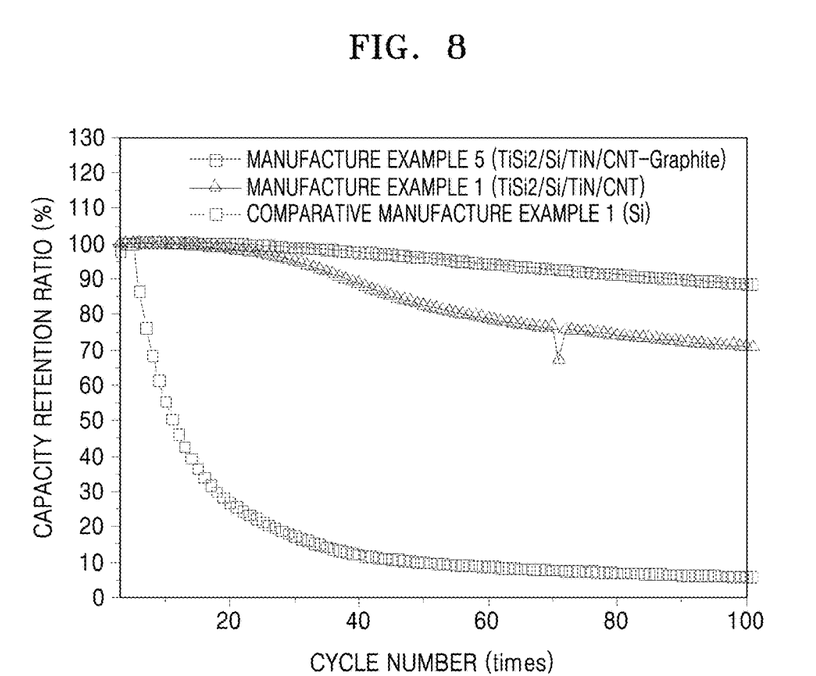
FIG. 8 is a graph showing lifespan characteristics of coin-half cells prepared in Manufacturing Examples 1 and 2 and Comparative Manufacturing Example 1.

Initial efficiency and capacity retention ratios of the coin-half cells prepared in Manufacturing Examples 1 and 2 and Comparative Manufacturing Example 1 were calculated as defined in Equations 1 and 2. The results of capacity retention ratio analysis of the coin-half cells prepared in Manufacturing Examples 1 and 2 and Comparative Manufacturing Example 1 are as shown in FIG. 8. Also, the results of initial efficiency analysis and capacity retention ratio analysis of the coin-half cells prepared in Manufacturing Examples 1 and 2 and Comparative Manufacturing Example 1 are as shown in Table 1.

$$\text{Initial efficiency}(\%) = (\text{Discharge capacity of } 1^{st} \text{ cycle/charge capacity of } 1^{st} \text{ cycle}) \times 100 \quad \text{[Equation 1]}$$

$$\text{Capacity retention ratio}(\%) = (\text{Discharge capacity of } 100^{th} \text{ cycle/discharge capacity of } 1^{st} \text{ cycle}) \times 100 \quad \text{[Equation 2]}$$

TABLE 1

|  | Initial efficiency [%] | Lifespan characteristics (@100th cycle) [%] |
|---|---|---|
| Manufacturing Example 1 | 85.3 | 70.7 |
| Manufacturing Example 2 | 86.6 | 88.8 |
| Comparative Manufacturing Example 1 | 72.3 | 5.83 |

As shown in Table 1 and FIG. 8, the coin-half cells prepared in Manufacturing Examples 1 and 2 had significantly improved lifespan characteristics and initial efficiency compared to those of the coin-half cell prepared in Comparative Manufacturing Example 1.

As described above, when a composite anode active material according to the one or more of the above embodiments of the invention is used, a volume change caused by intercalation/deintercalation of lithium ions decreases, and a side reaction caused by contact with an electrolyte may be suppressed. Thus, when the composite anode active material is used, a lithium secondary battery having improved lifespan and capacity characteristics and improved electrochemical stability as well as improved durability may be manufactured.

It should be understood that exemplary embodiments described herein should be considered in a descriptive sense only and not for purposes of limitation. Descriptions of features or each exemplary embodiment should typically be considered as available for other similar features or other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A composite anode active material comprising:
   a metal silicide core;
   a silicon shell which surrounds an entirety of the metal silicide core; and
   a metal nitride and a carbon material which are directly disposed on an outer surface of the silicon shell,
   wherein the metal silicide is $TiSi_x$ (where, $0<x\leq2$).

2. The composite anode active material of claim 1, wherein the carbon material includes at least one of carbon nanotubes (CNTs), graphene, graphite, and carbon fibers.

3. The composite anode active material of claim 1, wherein an amount of the carbon material is in a range of about 1 part to about 70 parts by weight based on 100 parts by weight of a total weight of the composite anode active material.

4. The composite anode active material of claim 1, wherein the metal silicide and the metal nitride comprise the same metal.

5. The composite anode active material of claim 4, wherein the metal silicide and the metal nitride comprise at least one metal of titanium (Ti), vanadium (V), copper (Cu), zinc (Zn), molybdenum (Mo), nickel (Ni), aluminum (Al), calcium (Ca), magnesium (Mg), iron (Fe), and chrome (Cr).

6. A method of preparing a composite anode active material, the method comprising:
   milling a metal silicide; and
   heat-treating the milled metal silicide in a nitrogen atmosphere; and combining the heat-treated resultant and a carbon material to obtain a combination and then milling the combination; and wherein
   the composite anode active material comprises: a metal silicide core;
   a silicon shell which surrounds an entirety of the metal silicide core; and
   a metal nitride and a carbon material which are directly disposed on an outer surface of the silicon shell,
   wherein the metal silicide is $TiSi_x$ (where, $0<x<$ or equal 2).

7. The method of claim 6, wherein the milling the combination is performed for about 120 minutes or less.

8. The method of claim 6, wherein the heat-treating is performed at a temperature in a range of about 800 degrees Celsius to about 1200 degrees Celsius.

9. An anode comprising a composite anode active material, wherein the composite anode active material comprises:
   a metal silicide core;
   a silicon shell which surrounds an entirety of the metal silicide core; and
   a metal nitride and a carbon material which are directly disposed on an outer surface of the silicon shell,
   wherein the metal silicide is $TiSi_x$ (where, $0<x\leq2$).

10. The anode of claim 9 further comprising a carbon material.

11. The anode of claim 9, wherein the carbon material includes at least one of carbon nanotubes (CNTs), graphene, graphite, and carbon fibers.

12. The anode of claim 9, wherein an amount of the carbon material is in a range of about 1 part to about 70 parts by weight based on 100 parts by weight of a total weight of the composite anode active material.

13. The anode of claim 9, wherein the metal silicide and the metal nitride comprise the same metal.

14. The anode of claim 9, wherein the metal silicide and the metal nitride comprise at least one metal of titanium (Ti), vanadium (V), copper (Cu), zinc (Zn), molybdenum (Mo), nickel (Ni), aluminum (Al), calcium (Ca), magnesium (Mg), iron (Fe), and chrome (Cr).

15. A lithium secondary battery comprising an anode comprising a composite anode active material, wherein the composite anode active material comprises:
   a metal silicide core;
   a silicon shell which surrounds an entirety of the metal silicide core; and
   a metal nitride and a carbon material which are directly disposed on an outer surface of the silicon shell,
   wherein the metal silicide is $TiSi_x$ (where, $0<x\leq2$).

* * * * *